Mar. 27, 1923.
J. W. HARVEY
HOG FEEDER
Filed July 22, 1919
1,449,818
2 sheets-sheet 1
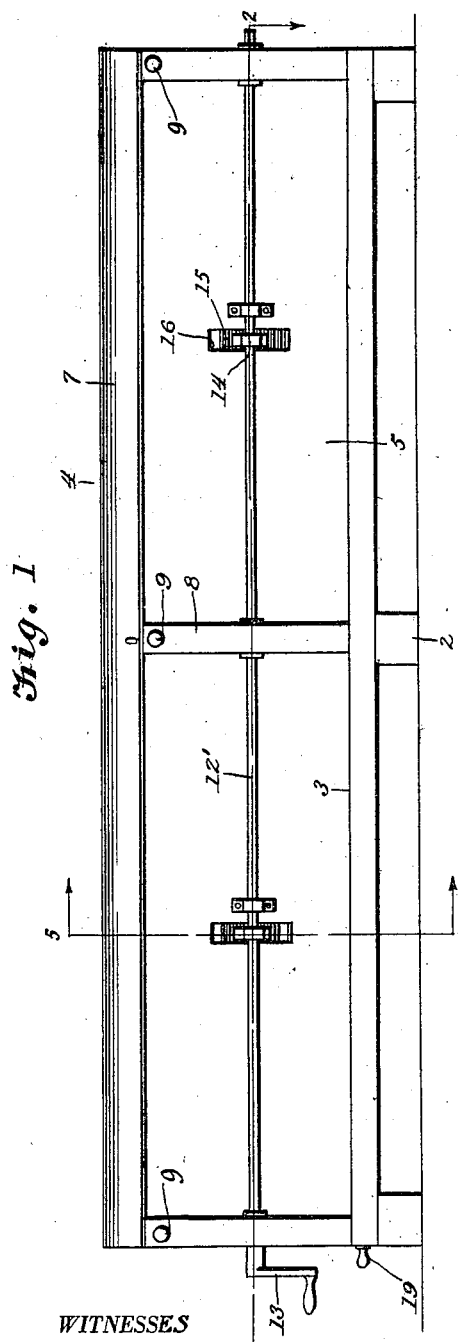
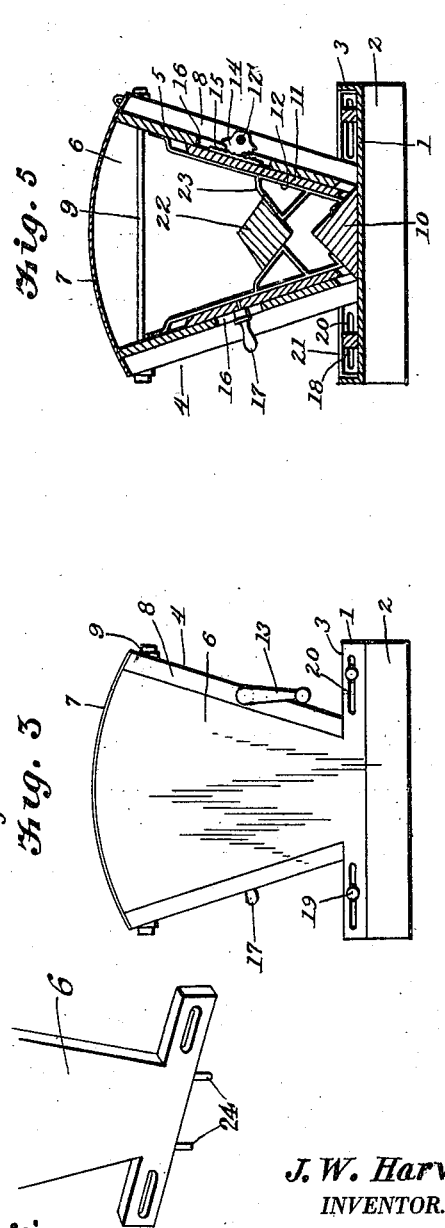
WITNESSES
Geo. E. Logan
J. W. Harvey
INVENTOR.
BY
Victor J. Evans
ATTORNEY.

Mar. 27, 1923.

J. W. HARVEY

HOG FEEDER

Filed July 22, 1919

WITNESSES
Geo. E. Logan

J. W. Harvey
INVENTOR.

BY
Victor J. Evans
ATTORNEY.

Patented Mar. 27, 1923.

1,449,818

UNITED STATES PATENT OFFICE.

JOHN W. HARVEY, OF SIOUX FALLS, SOUTH DAKOTA, ASSIGNOR OF ONE-THIRD TO ORIN M. LANE AND ONE-THIRD TO EMIL L. SCHAGER, BOTH OF SIOUX FALLS, SOUTH DAKOTA.

HOG FEEDER.

Application filed July 22, 1919. Serial No. 312,512.

*To all whom it may concern:*

Be it known that I, JOHN W. HARVEY, a citizen of the United States, residing at Sioux Falls, in the county of Minnehaha and State of South Dakota, have invented new and useful Improvements in Hog Feeders, of which the following is a specification.

This invention relates to stock feeders, more particularly adapted for hogs, and the principal object of the invention is to provide means for regulating the amount of feed delivered to the trough from a hopper containing the feed.

Another object of the invention is to provide means for directing the feed to the trough and means for preventing the feed from clogging up in the hopper.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation of the invention;

Figure 3 is an end view of the feeder;

Figure 5 is a cross section on line 5—5 of Figure 1.

Figure 6 is a detail view showing the pins in the end of one of the end pieces.

Figure 2:
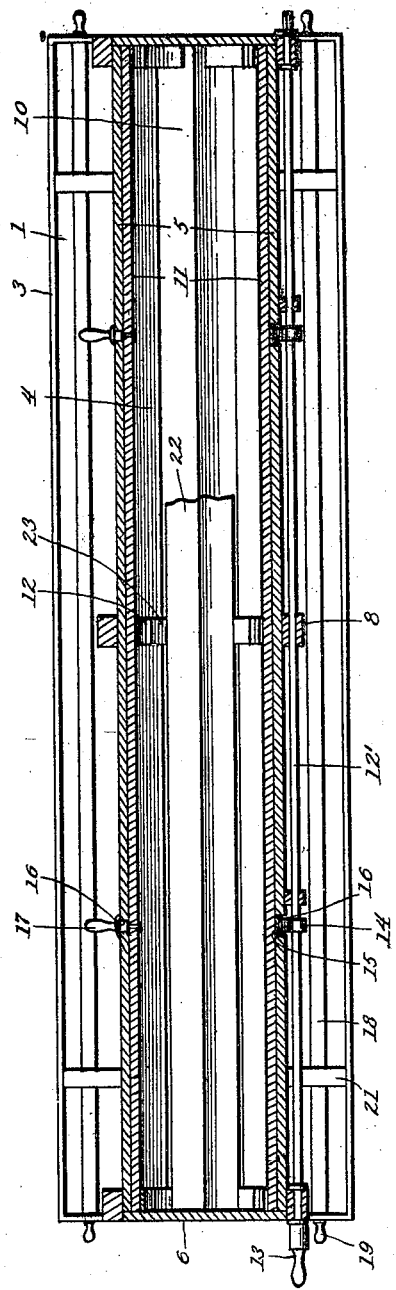
Figure 2 is a horizontal section on line 2—2 of Figure 1.
Figure 4:
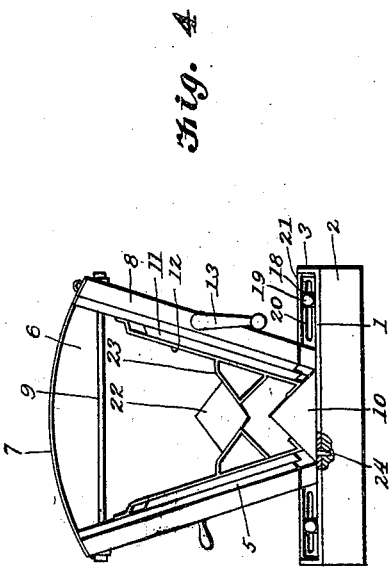
Figure 4 is a view with one end removed.

In these views 1 indicates the trough part of the device which is located on the supporting beams 2. This trough part is provided with the outer flanges 3 for retaining the feed. 4 indicates the feed hopper which is centrally arranged of the trough part and this hopper comprises the inclined side pieces 5, the end pieces 6 which form continuations of the ends of the trough part, and the top or cover 7 which is made removable so that the feed may be placed in the hopper. The side pieces 5 are supported by the inclined beams 8 and they are prevented from being spread outward by the stay bolts 9. The lower edges of the side pieces 5 are spaced from the bottom of the trough and a triangular-shaped member 10 is centrally arranged in the bottom of the hopper with its base resting on the bottom of the trough and its inclined edges spaced from the lower edges of the hopper. In this way the feed may pass from the hopper through these spaces into the trough. These spaces are regulated by means of the movable slides 11 engaging the brackets 12 arranged on the inner sides of the hopper and having their lower ends connected with the triangular-shaped member 10. The means for adjusting said slides may consist of a shaft 12' journaled in the beams 8 and provided with the crank 13 so that the said shaft may be rotated. This shaft carries the segmental gears 14 which engage racks 15 on the slides and extends through slots 16 in the side pieces of the hopper. Thus by rotating the shaft in one direction or the other, the slides may be raised or lowered to regulate the size of the spaces through which the feed passes from the hopper into the two parts of the trough. Instead of having the shaft and associating parts, I may provide a handle 17 which is connected with the slide and extends through the slot 16 in the side of the hopper.

I also provide additional means for controlling the feeding of the material to the two parts of the trough and such means includes a strip 18 located in each part of the trough and extending from one end to the other thereof and adapted to be moved away from or towards the outer flange 3 by means of the handles 19 connected with the ends of the strips, said handles passing through slots 20 formed in the end flanges of the trough part. The strips are held in place by means of the cross pieces 21 extending above the two parts of the trough and having their ends connected with the hopper and with the outer flanges.

To prevent the material from clogging in the hopper, I provide a member 22 of diamond shape in cross section which breaks up the material when coming in contact with the sharp upper edge and thence is deflected downwardly on both sides to be evenly distributed on the inclined walls of the member 10. The member 22 extends from end to end of the hopper and is supported therein above the member 10 by means of the brackets 23 on the ends of the hopper. These ends of the hopper are provided with pegs 24 which extend into openings 24' formed in the ends of the trough part and the outer supporting beams therefor.

It will thus be seen that the material in the hopper will be automatically fed to the trough parts as the animals consume the feed in said trough parts and that this feeding of the material from the hopper to the trough parts can be regulated by moving the slots and the strips in the troughs.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A hog feeder comprising a trough part, a hopper centrally arranged thereon and having the lower edges of its side pieces spaced from the bottom of the trough, a triangular shaped member centrally arranged in the hopper and having its base resting on the bottom of the trough, a diamond shaped member located in said hopper, brackets supporting said member, movable slides on each side of the hopper for controlling the feed of material from the hopper to the trough and means for regulating said slides.

In testimony whereof I affix my signature.

JOHN W. HARVEY.